H. A. MILLER.
PNEUMATIC TIRE REMOVING APPARATUS.
APPLICATION FILED OCT. 23, 1919.

1,396,707.

Patented Nov. 8, 1921.

Inventor
Harry A. Miller
By
Attorney

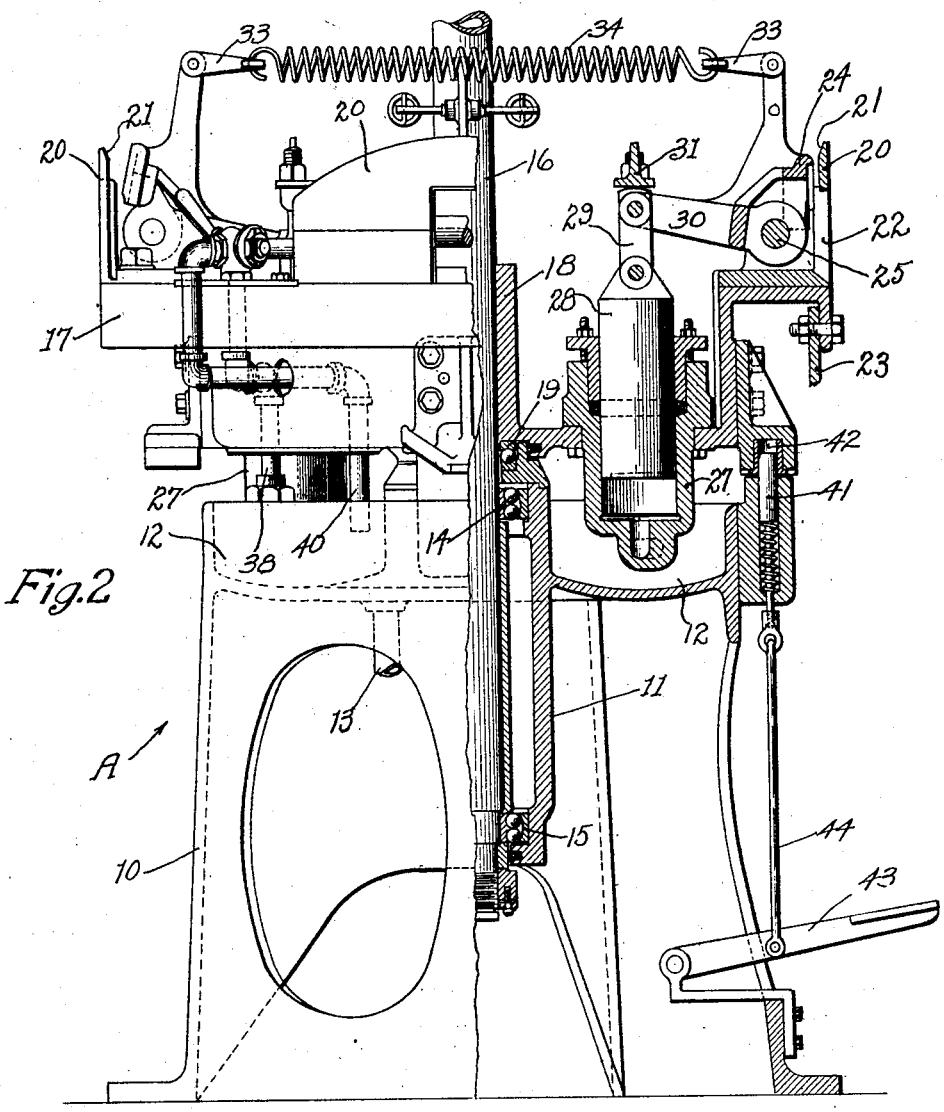

H. A. MILLER.
PNEUMATIC TIRE REMOVING APPARATUS.
APPLICATION FILED OCT. 23, 1919.
1,396,707.
Patented Nov. 8, 1921.
3 SHEETS—SHEET 3.
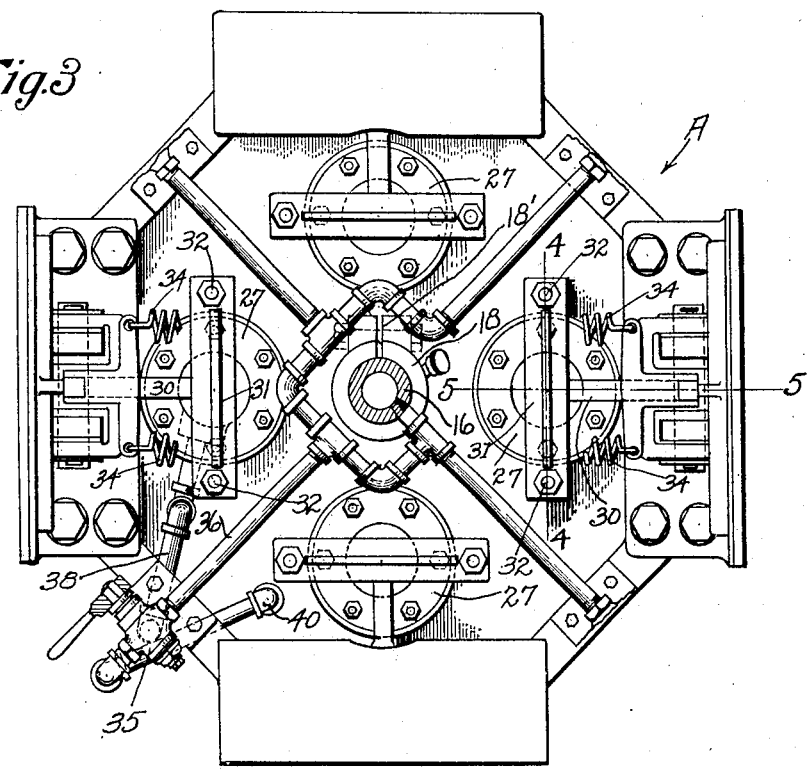
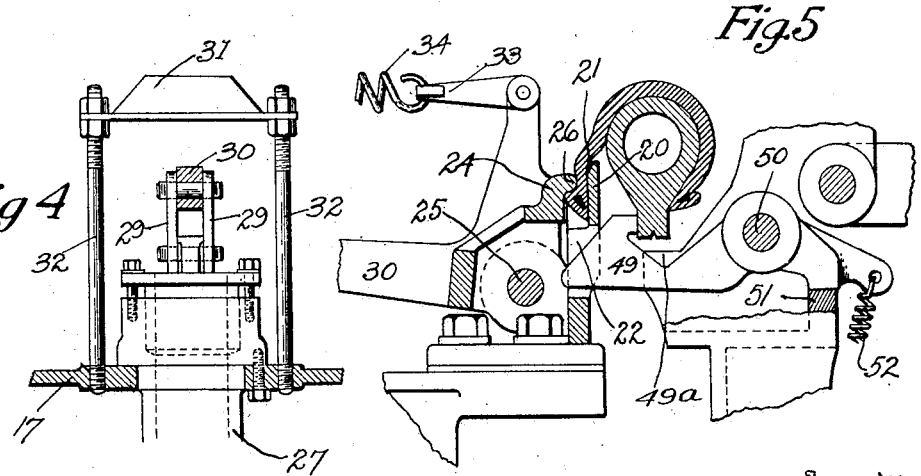
Inventor
Harry A. Miller
By
Attorney

UNITED STATES PATENT OFFICE.

HARRY A. MILLER, OF AKRON, OHIO, ASSIGNOR TO THE GOODYEAR TIRE & RUBBER COMPANY, OF AKRON, OHIO, A CORPORATION OF OHIO.

PNEUMATIC-TIRE-REMOVING APPARATUS.

1,396,707. Specification of Letters Patent. Patented Nov. 8, 1921.

Application filed October 23, 1919. Serial No. 332,601.

*To all whom it may concern:*

Be it known that I, HARRY A. MILLER, a citizen of the United States, and resident of Akron, Ohio, have invented new and useful Improvements in Pneumatic-Tire-Removing Apparatus, of which the following is a specification.

The present invention relates to improvements in apparatus for removing or stripping tires from the solid ring cores upon which they have been built and cured, and is designed particularly for use in connection with tires of the clencher type which are provided with extensible bead portions.

It is the primary object of the invention to provide a practical mechanism for stripping tires from the forming cores as they are received in their heated condition direct from the curing ovens, whereby the handling of the same by the workmen is precluded to a great extent, and the tendency toward breaking any part of the bead portion by excessive stretching of the same is practically overcome.

It is further desired to provide a mechanism of the above described character wherein the instrumentalities for performing the stripping operation are active principally upon or against the core, and wherein the number of active mechanical devices engaging with or in contact with the tire itself is greatly reduced. Inasmuch as the possibility of mutilating the tire by careless operators logically increases in direct ratio to the number of elements operable upon the tire, it will be evident, by thus reducing the number of such elements, that the tendency toward waste from such mutilation or disfigurement is proportionately lessened with a consequent saving in time and money. These and other objects are accomplished in a practical and efficient manner by means of devices hereinafter described in detail and illustrated in the accompanying drawings, certain features of construction and combination of parts for which protection is desired being defined and pointed out in the claims appended hereunto and forming a part of this specification.

In the drawings, which are illustrative of a preferred form of the invention, and in which like characters of reference designate corresponding parts throughout each of the several views:

Fig. 2 is an enlarged view partly in side elevation and partly in section, of the core and tire supporting mechanism, and the devices associated therewith.

Fig. 3 is a top plan view of Fig. 2 illustrating one of a plurality of the tire and core supporting units, and wherein for the sake of clearness, devices forming other and duplicate units have been eliminated;

Fig. 4 is a still further enlarged view, partly in section, on the line 4—4 of Fig. 3; and Fig. 5 is a vertical sectional view on an enlarged scale taken on the line 5—5 of Fig. 3.

Figure 1:
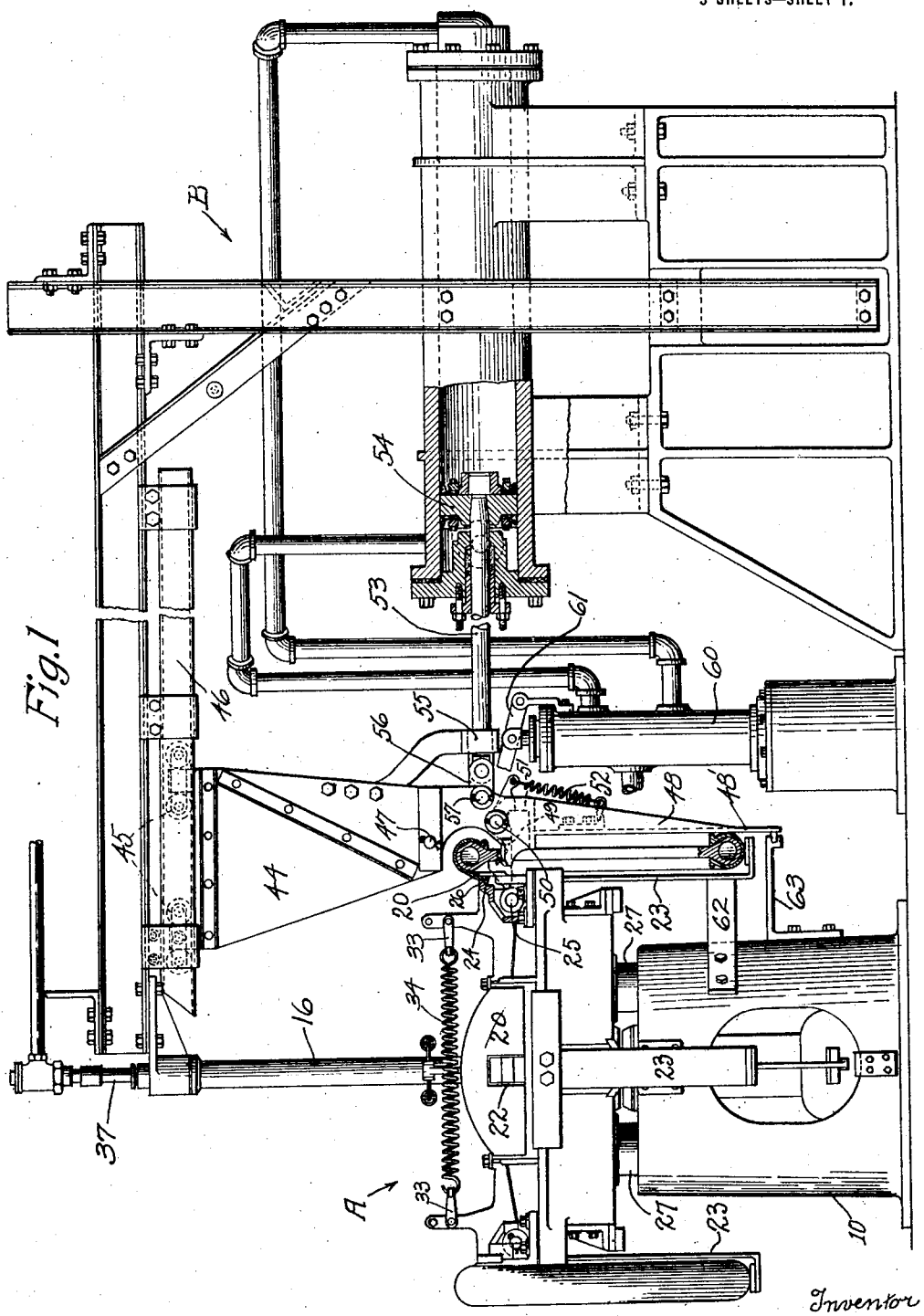
Figure 1 is a side elevation of the machine, with parts broken away and shown in section, and illustrating a tire and core mounted in position for the stripping operation.

Referring to the drawings, the invention in the embodiment illustrated comprises a tire gripping and core supporting mechanism designated as a whole by the character A, and a core removing mechanism designated by the character B, each of which will now be described in detail.

*Tire gripping and core supporting mechanism "A".*

The tire gripping and core supporting mechanism A comprises a supporting base member 10 preferably of cylindrical form in horizontal section, provided with a vertically disposed central hub portion 11 and formed with an annular drain basin or sink 12, having a drain outlet 13 for a purpose presently apparent. Mounted for rotation in the hub portion 11 and anti-friction bearings 14 and 15 is a vertical hollow shaft 16, which serves as an axial mounting for a horizontally disposed revoluble table 17 provided with a central hub portion 18 clamped about the shaft 16 as at 18′ and designed to rotate the shaft therewith. Anti-friction bearings 19 support the table 17 upon the hub portion 11 and a plurality of pressure actuated clamping devices are mounted upon the said table and revoluble therewith. These clamping devices are grouped in spaced relation upon the table, each group being designed to support a tire and core in position for successive engagement by the core removing mechanism B as the table 17 is turned upon the base member 10. Inasmuch as the groups of clamping devices are of duplicate construction a detailed description of one group is deemed sufficient to impart a clear understanding of the invention. The mechanism of each clamping device comprises the following:

An upstanding jaw 20, provided with an arcuate beveled edge 21, and having a centrally disposed opening 22 therethrough, is suitably secured upon the outer edge of the table 17. Upon this jaw the tire forming core is adapted to be hung with the beveled edge 21 between the said core and bead portion of the tire, as best illustrated in Fig. 1 of the drawing. In vertical alinement with the jaw 20 and secured upon the edge of the table 17 is a depending L-shaped bracket 23, against which the lower portion of the core is designed to be supported to retain it in an upright position. Associated with the jaw 20 is a second jaw 24 pivoted as at 25 for movement toward and away from the jaw 20 and provided with a projecting arcuate rib 26 along its upper portion which, together with the arcuate edge 21 of the jaw 20 correspond approximately in curvature to that of the bead portion of the tire. As the jaw 24 is moved toward the jaw 20 by means presently described the tire is clamped between the two, as illustrated in Fig. 5 of the drawings, with the arcuate rib 26 clamped over the tire bead, thus securely suspending said tire with the core therein from the table 17. A fluid pressure cylinder 27 is carried upon the table 17 adjacent each clamping device, the piston 28 of which is connected by a link 29 with an inwardly extending lever portion 30 of the jaw 24, to move said jaw when pressure is applied within said cylinder. The upward movement of the piston 28 is limited by means of a cross-head 31 adjustable upon vertical rods 32 rising from the table 17, whereby the movement of the jaw 24 is regulated to prevent undue pressure upon the tire and bead, (see Fig. 4). The two jaws 24 of diametrically opposite groups of clamping devices are connected as at 33 by retractile springs 34 which act to release the tire when pressure is released from within the cylinder 27.

A control valve 35, preferably of the three-way type, is provided upon the table for each clamping group and is connected by a pipe 36 to the hollow shaft 16, which is in turn connected as at 37 to a source of fluid supply. An inlet pipe 38 admits fluid into the cylinder 27 from the valve 35, and an exhaust pipe 40 drains from the cylinder into the sink or basin 11.

As each tire and core is mounted upon the table 17 with the lower periphery of the tire resting against the bracket 23 and the jaws 20 and 24 positioned as before described by means of the valve 35, the table 17 is revolved to position the same in alinement with the core removing mechanism B. In this position the table is held against accidental movement by means of locking mechanism comprising, a spring pressed bolt 41, upon the base member 10, engaging within a socket 42, in the table 17, one of which sockets is provided for each group of clamping groups. A treadle 43 and connecting link 44, are provided upon the base 10 for releasing the table as desired.

*Core removing mechanism "B".*

The core removing mechanism B will now be described. A vertical hanger bracket 44 is suspended from rollers 45 in an overhead trackway 46 for movement toward and away from the table 17 and in a plane preferably radial with respect thereto. Pivotally mounted, as at 47, upon the lower portion of the hanger 44 is a vertically disposed core engaging frame 48 designed to swing upon its pivot 47 toward and away from the table 17. A horizontal dog 49, is pivoted adjacent its central portion, to rock between shoulders 49ª upon a stud 50, in the core engaging frame 48, and is normally held with its rear end engaging a stop shoulder 51, by means of a retractile spring 52. The hanger bracket 44, and parts carried thereon are reciprocated toward and away from the table 17, by means of a piston rod 53, of a hydraulic ram 54, which piston rod is guided at its forward end in depending bracket 55 fast upon the hanger 44. A link 56, connects the forward end of the piston 53 to the core carrying frame, as at 57, whereby said frame is free to swing upon its pivot 47. By means of a control valve 60, and hand-lever 61, the ram is controlled to move the core-carrying frame toward and away from the table 17.

The operation of the apparatus is as follows:

A plurality of tires and cores are mounted upon the table 17, with the beveled edge 21, of the jaw 20, positioned between the upper portion of the tire and core as before described, and with the lower portion of the tire resting against the L-shaped bracket 23. The valves 35 are adjusted to admit pressure into the cylinders 27, to actuate the jaw 24, and clamp the tire in place, as before described. The table 17, is then revolved to successively position each tire and core in line with the core removing mechanism. The ram 54, is operated by means of the valve 60, to move the hanger 44, and core carrying frame 48 against the tire and core. As these elements move forward the frame 48 is swung forward on its pivot 47 with its lower extremity 48' in advance of the dog 49, which portion 48' first contacts with the lower portion of the tire, forcing it and the core back against the L-shaped bracket 23 to hold the said tire and core against the L-shaped bracket 23. A brace 62 is provided upon the base 10 to strengthen the bracket 23 against the impact of the core carrying frame and a stop 63, fixed upon the base 10, limits the forward movement of the portion 48' to prevent injury to the tire. Continued forward movement of the hanger 44 and frame 48 straightens the frame upon its pivot 47, and forces the dog 49, beneath the inner periphery of the core with a snap action. In this position the dog 49 is inserted within the opening 22 in the jaw 20, as shown in Fig. 5 of the drawings, and the rear portion of said dog is held against the stop 51, by the action of the retractile spring 52. By means of the valve 60, the ram is now actuated to withdraw the hanger 44, and frame 48, the dog 49, pulling the core from within the tire first at the top portion thereof where said tire is held by the jaws 20, and 24. Owing to the fact that the pull of the piston rod 53 is above the point of the pull upon the dog 49, exerted by the resistance of the core against withdrawal from the tire, the frame 48, assumes an inclined position on its pivot 47 with the portion 48' being forced forward. This action of the frame 48, serves to hold the lower portion of the tire and core against the support 23, and to cant the core so that it is inclined from the point of its engagement with the dog 49, whereby, after the top portion thereof is released from within the tire, an oblique lifting action is exerted on the core, by the shoulders 49ª, to facilitate removal of the same. As fast as the core is removed from a tire, the proper valve 35, is operated to release the tire which is removed from the table and another tire and core mounted in its place.

The table is revolved to position another tire and core in line with the core removing mechanism, the detached core removed from the core carrying frame and the operation, previously described, repeated.

While I have described and shown the support 23 as partially sustaining the weight of the tire and core, it has been found, in actual practice, that in tires of smaller diameter the jaws 20 and 24 are sufficient to support the weight of the tire and core.

Furthermore, while I have described certain features of the mechanism as operated by hydraulic pressure it is to be understood that other pressure mediums may be utilized or mechanical devices may be substituted therefor, and that other changes and modifications may be resorted to without departing from the spirit of the invention.

It will now be apparent that I have provided a practical mechanism for performing the stripping operation upon a plurality of tires, particularly of the clencher type, in rapid succession, wherein the tire is firmly held by a single clamping device, and the core removed therefrom with a generally oblique upward pulling action, and whereby, owing to the inclined position the core is forced to assume during its removal, the bead portion is stretched in an even and gradual manner. Owing to the fact that a single clamping device is used, the tire is free to yield along the lines of least resistance to lessen the stress and strain coincident with the stretching of the bead portion, and the tendency toward breaking or mutilating of said bead portion is thereby eliminated.

What I claim is:

1. An apparatus for removing the forming core from a tire casing comprising, a support for a tire and core, a core removing mechanism movable with respect to the support, means for holding the tire upon the support against the action of the core removing mechanism, and means for actuating the core removing mechanism.

2. An apparatus for removing the forming core from a tire casing comprising, a support for a tire casing and core, a core removing mechanism movable toward and away from the support, means for holding the tire upon the support against the action of the core removing mechanism, and means for actuating the core removing mechanism.

3. An apparatus for removing the forming core from a tire casing comprising, a support for a tire casing and core, reciprocable core removing mechanism associated with the support, clamping mechanism for holding the tire upon the support against the action of the core removing mechanism, and means for reciprocating the core removing mechanism to remove the core from the tire casing.

4. An apparatus for removing the forming core from a tire casing comprising, a support for a tire casing and core, reciprocable mechanism for removing the core from the tire casing, clamping mechanism for holding the tire against the action of the reciprocable mechanism, and pressure actuated means for operating the reciprocable mechanism to remove the core from the tire.

5. An apparatus for removing the forming core from a tire comprising, a support for a tire and core, reciprocable mechanism engaging the core and removing the same, pressure actuated clamping mechanism for holding the tire upon the support, and pressure actuated means for operating the reciprocable mechanism to remove the core.

6. An apparatus for removing the forming core from a tire comprising, a support for a tire casing and tire, a reciprocating core removing element associated with the support, pressure actuated clamping devices for holding the tire upon the support, and against the action of the core removing element, and hydraulic mechanism for reciprocating the core removing element.

7. An apparatus for removing the forming core from a tire comprising, a support for a tire casing and core, a reciprocating core removing device, means upon said core removing device for gripping the core, pressure actuated clamping devices upon the support for holding the tire, and mechanism for reciprocating the core removing device.

8. An apparatus for removing the forming core from a tire casing comprising, a support for a tire casing and core, a reciprocating core removing device associated with said support, means upon said core removing device for gripping the core with a snap action, pressure actuated clamping devices upon the support for holding the tire, and mechanism for reciprocating the core removing device.

9. An apparatus for removing the forming core from a tire casing comprising, a support for holding a tire casing and core in upright position, pressure actuated clamping devices upon the support for gripping the tire adjacent its upper portion, tire sustaining means upon the support for engaging the tire casing adjacent its lower portion, a reciprocating device for removing the core from the tire casing, means upon the reciprocating device for engaging the core at its upper portion, means upon the reciprocating device for abutting the lower portion of the tire casing and holding the same against the sustaining means, and mechanism for actuating the reciprocating mechanism.

10. An apparatus for removing the forming core from a tire casing comprising, a support for holding a tire casing and core in an upright position, pressure actuated clamping devices upon the support for gripping the tire adjacent its upper position, a bracing element engaging the lower portion of the tire casing, a longitudinally reciprocating element associated with the support, a core-carrying frame pivoted upon the reciprocating element constructed to engage the lower portion of the tire to hold said tire against the bracing element, means upon the core-carrying frame for engaging the core adjacent its upper portion, and mechanism for actuating the reciprocating element.

11. An apparatus for removing the forming core from a tire casing comprising, a support upon which the tire casing and core are suspended in upright position, pressure actuated clamping devices upon the support for engaging the tire adjacent its upper portion, bracing means engaging the lower portion of the tire casing, a longitudinal reciprocating element, associated with the support, a vertically disposed core-carrying frame pivoted to swing upon the reciprocating element to hold the lower portion of the tire casing and core against the bracing means, means upon the core-carrying frame for engaging the core at its upper portion, whereby said upper portion is first removed from the casing, and means for actuating the reciprocating element, whereby the remainder of the core is removed from the casing with an oblique lifting action.

12. An apparatus for removing a forming core from a tire casing comprising, in combination with a revoluble support, a plurality of spaced apart elements upon the support, each of which elements is designed to sustain a tire casing and core in an upright position, a traveling core-removing element engageable successively with each casing and core after the support has been revolved, and means for actuating the core-removing element.

13. An apparatus for removing a forming core from a tire casing comprising, in combination with a revoluble support, a plurality of spaced-apart clamping elements upon the support each of which elements is designed to sustain a tire casing and core in upright position, means associated with each clamping element for actuating said elements, a traveling core-removing element engageable successively with each casing and core after the support has been revolved, and means for actuating the core-removing element.

14. An apparatus for removing a forming core from a tire casing comprising, the combination with a revoluble support, a plurality of spaced-apart clamping elements upon the support, each of said elements being designed to sustain a casing and core in upright position, pressure operated means for actuating the clamping elements, means for controlling each clamping element independently, a traveling core-removing element engageable successively with each casing and core as the support is revolved, and mechanism for actuating the core-removing element.

15. An apparatus for removing a forming core from a tire comprising, in combination with a revoluble support, a plurality of spaced-apart clamping elements upon the support, each element being constructed to sustain a casing and core in upright position, means for normally releasing each clamping element, pressure operated means for actuating the clamping elements, a pressure control device for each clamping element, a traveling core removing element engageable successively with each casing and core as the table is revolved, and means for actuating the core-removing element.

16. An apparatus for removing a forming core from a tire casing comprising, in combination with a support, a revoluble table upon the support, a plurality of elements, arranged in spaced-apart relation on said table, each element being designed to sustain a casing and core in upright position, actuating means associated with each element to sustain and release a casing as desired, a traveling core-removing element engageable successively with each casing and core as the table is revolved, and mechanism for actuating the core-removing mechanism.

17. An apparatus for removing a forming core from a tire casing comprising, in combination with a support, a revoluble table upon the support, a plurality of clamping elements arranged in spaced-apart relation on said table for sustaining a plurality of tire casings and their respective cores in upright position, means for actuating each clamping element, a traveling core-removing element engageable successively with each casing and core as the table is revolved, and means for actuating the core-removing element.

18. An apparatus for removing a forming core from a tire casing comprising, in combination with a support, a revoluble table upon the support, a plurality of clamping elements arranged in spaced-apart relation on said table for sustaining a plurality of tires and their respective cores in upright position, means for actuating each clamping element to grip and release a casing, a reciprocating core-removing mechanism engageable successively with each casing and core as the table is revolved, and mechanism for actuating the core removing mechanism.

19. An apparatus for removing a core from a tire casing comprising in combination with a support, a table revolubly mounted upon said support, a plurality of spaced-apart clamping elements upon the table for sustaining a plurality of tire casings and their respective cores in upright position, pressure actuated means for operating each clamping element to grip and release a casing, a reciprocating core-removing frame engageable successively with each core as the table is revolved, means upon the core-removing frame for engaging the core with a snap action, and pressure actuated mechanism for reciprocating the core-removing frame.

20. In an apparatus of the class described, the combination with means for supporting a tire casing while mounted upon its core, means for gripping the side wall of the casing, and reciprocating means for gripping the core and removing the same, first with a lateral pull, and then with an oblique lifting action.

21. In an apparatus of the class described, the combination with means for supporting a tire casing while mounted upon its core, in upright position, of means upon the support for gripping the side wall of the casing, and horizontally reciprocating mechanism for gripping the core and removing the same from the casing, first with a lateral pull, and then with an oblique lifting action.

22. In an apparatus of the class described, the combination with a support of means upon the support for gripping a tire casing while mounted upon its core, whereby said casing and core are suspended in upright position, a reciprocating element engageable with the core adjacent its upper portion, and means for actuating the reciprocating element, whereby the core is removed from the casing.

23. In an apparatus of the class described, the combination with a support of clamping means upon the support for gripping a tire casing while mounted upon its core, whereby said casing and core are suspended in upright position, a reciprocating core-removing carriage, means upon the carriage for gripping the core, and means for actuating the carriage, whereby the core is removed first with a lateral pull, and then with an oblique lifting action.

24. In an apparatus of the class described, the combination with a support of clamping means upon the support for gripping a tire casing while mounted upon its core, whereby said casing and core are suspended in upright position, a reciprocating core-removing carriage, a core-carrying frame pivoted to swing upon said carriage, a core-engaging member upon the frame, and mechanism for reciprocating the core carriage, whereby said core-carrying frame will swing to remove the core from the casing with a substantially oblique lifting action.

25. An apparatus for removing the forming core from a tire casing comprising, in combination with a support, a revoluble table upon said support, a plurality of spaced apart clamping elements upon the table for sustaining a plurality of casings and their respective cores in upright position, pressure actuated means for operating each clamping element to grip and release a casing, a reciprocating core-removing frame engageable successively with each core as the table is revolved, means upon the core-removing frame for engaging the core, means for reciprocating the core-removing frame, and means upon the support for locking the table in a desired position.

26. An apparatus for removing the forming core from a tire casing comprising, a tire clamping and supporting means, and a core removing means.

27. An apparatus for removing the forming core from a tire, comprising means adapted to support the tire and core, and means adapted to engage and remove the core from the tire in a substantially lateral direction with respect thereto.

28. An apparatus for removing the forming core from a tire, comprising tire engaging means adapted to support the tire and core, and means adapted to engage and remove the core from the tire in a substantially lateral direction with respect thereto.

29. An apparatus for removing the forming core from a tire, comprising means adapted to support the tire and core, and means adapted to engage and remove the core from the tire with an oblique lifting action.

30. An apparatus for removing the forming core from a tire, comprising tire engaging means adapted to support the tire and core, and means adapted to engage and remove the core from the tire with an oblique lifting action.

31. An apparatus for removing the forming core from a tire, comprising means adapted to support the tire and core in a substantially vertical plane, and means adapted to engage and remove the core from the tire in a substantially lateral direction with respect thereto.

32. An apparatus for removing the forming core from a tire, comprising means adapted to support the tire and core in a substantially vertical plane, and means adapted to engage and remove the core from the tire with an oblique lifting action.

33. An apparatus for removing the forming core from a tire, comprising tire gripping means adapted to support the tire and core in a substantially vertical plane, and means adapted to engage and remove the core from the tire with an oblique lifting action.

34. An apparatus for removing the forming core from a tire, comprising means adapted to support the tire and core, and reciprocable mechanism adapted to engage the core and remove the core from the tire in a substantially lateral direction with respect thereto.

35. An apparatus for removing the forming core from a tire, comprising means adapted to support the tire and core, and reciprocable core removing mechanism adapted to engage and remove the core from the tire with an oblique lifting action.

36. An apparatus for removing the forming core from a tire, comprising means adapted to support the tire and core in a substantially vertical plane, and reciprocable core removing mechanism adapted to engage and remove the core from the tire with an oblique lifting action.

37. An apparatus for removing the forming core from a tire, comprising tire engaging means adapted to support the tire and core in a substantially vertical plane, and reciprocable core removing mechanism adapted to engage and remove the core from the tire with an oblique lifting action.

38. An apparatus for removing the forming core from a tire, comprising pressure actuated means adapted to support the tire and core in a substantially vertical plane, and pressure actuated mechanism adapted to engage and remove the core from the tire in a substantially lateral direction with respect thereto.

39. An apparatus for removing the forming core from a tire, comprising pressure actuated means adapted to support the tire and core in a substantially vertical plane, and pressure actuated mechanism adapted to engage and remove the core from the tire with an oblique lifting action.

40. An apparatus for removing a forming core from a tire casing comprising means for gripping one side of the casing, means for engaging the core, and means for effecting a separation of the aforesaid means.

In witness whereof, I have hereunto signed my name in the presence of two subscribing witnesses.

HARRY A. MILLER.

Witnesses:
 JOHN E. KEATING,
 PHILIP E. BARNES.